(12) United States Patent
Packer et al.

(10) Patent No.: US 10,762,143 B2
(45) Date of Patent: Sep. 1, 2020

(54) EXTENSION OF THIRD PARTY APPLICATION FUNCTIONALITY FOR INTENT DETERMINATION

(71) Applicant: Microsoft Technology Licensing, LLC, Redmond, WA (US)

(72) Inventors: Alan Packer, Redmond, WA (US); Ravi Bikkula, Sammamish, WA (US); Ye-Yi Wang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 408 days.

(21) Appl. No.: 14/622,815

(22) Filed: Feb. 13, 2015

(65) Prior Publication Data

US 2016/0239568 A1  Aug. 18, 2016

(51) Int. Cl.
*G06F 7/00* (2006.01)
*G06F 16/00* (2019.01)
*G06F 16/951* (2019.01)

(52) U.S. Cl.
CPC .................................. *G06F 16/951* (2019.01)

(58) Field of Classification Search
None
See application file for complete search history.

(56) References Cited

U.S. PATENT DOCUMENTS

| | | | |
|---|---|---|---|
| 5,255,386 A | 10/1993 | Prager | |
| 5,390,281 A | 2/1995 | Luciw et al. | |
| 5,644,735 A | 7/1997 | Luciw et al. | |
| 7,606,700 B2 | 10/2009 | Ramsey et al. | |
| 7,974,976 B2 | 7/2011 | Yahia et al. | |
| 8,346,563 B1 | 1/2013 | Hjelm et al. | |
| 8,942,986 B2 | 1/2015 | Cheyer et al. | |
| 9,305,548 B2 | 4/2016 | Kennewick et al. | |
| 2006/0229889 A1* | 10/2006 | Hodjat | G06F 9/4443 709/202 |
| 2011/0289015 A1* | 11/2011 | Mei | G06Q 10/04 705/347 |
| 2012/0016678 A1* | 1/2012 | Gruber | G06F 17/3087 704/275 |

(Continued)

OTHER PUBLICATIONS

Han, et al., "NLify: Third-Party Programming Support for Spoken Natural Language Interfaces", In TechReport MSR-TR-2012-128, Dec. 2012, 14 pages.

(Continued)

*Primary Examiner* — Tuan A Pham (57) ABSTRACT

Intent determination as a service (IaaS) is disclosed. A third party application may be provided access to an IaaS service. The third party application and the IaaS system may exchange or be provided registration data and information that allow configuration of data and interfaces used in provision of IaaS to the third party application. A query received as input at the third party application may be sent to the IaaS system and the intent of a query may be determined and indicated in a query response sent back to the third party application. A third party application may also interface with a device client application integrated into the operating system of a device as part of accessing an IaaS system. Use of IaaS for queries associated with or relevant to third party applications may extend the capabilities of the third party applications and device client applications.

19 Claims, 6 Drawing Sheets

(56) References Cited

U.S. PATENT DOCUMENTS

| | | | |
|---|---|---|---|
| 2013/0246932 A1* | 9/2013 | Zaveri | G06F 3/017 715/740 |
| 2014/0122610 A1 | 5/2014 | Jing et al. | |
| 2014/0172840 A1* | 6/2014 | Kumar | G06F 17/2247 707/723 |
| 2014/0172986 A1 | 6/2014 | Kumar et al. | |
| 2014/0173625 A1* | 6/2014 | Kumar | G06F 9/4843 718/106 |
| 2014/0222422 A1 | 8/2014 | Sarikaya et al. | |
| 2014/0330818 A1* | 11/2014 | Raina | G06Q 30/02 707/723 |
| 2014/0330819 A1* | 11/2014 | Raina | G06F 17/3053 707/723 |
| 2015/0026212 A1* | 1/2015 | Fink | G06F 17/30483 707/774 |
| 2015/0127466 A1 | 5/2015 | Zhu et al. | |

OTHER PUBLICATIONS

Hardtke, et al., "Demonstration of Improved Search Result Relevancy Using Real-Time Implicit Relevance Feedback", In Proceedings of the 32nd Annual International ACM SIGIR Conference on Research and Development in Information Retrieval, Jul. 19, 2009, 7 pages.

Morris, Karl A., "A Middleware to Support Services Delivery in a Domain-Specific Virtual Machine", In FIU Electronic Theses and Dissertations, Jun. 20, 2014, 117 pages.

"Microsoft Research Faculty Summit 2010", Published on: Jul. 12, 2010 Svailable at: http://research.microsoft.com/en-us/events/fs2010/agenda_expanded.aspx.

"WebSphere Application Server Liberty Core 8.5.5", Retrieved on: Oct. 13, 2014 Available at: http://www-01.ibm.com/support/knowledgecenter/SSD28V_8.5.5/com.ibm.websphere.osgi.zseries.doc/ae/ca_sca.html.

Kim, et al., "Understanding How People Interact with Web Search Results that Change in Real-Time Using Implicit Feedback", In Proceedings of the 22nd ACM international conference on Conference on information & knowledge management, Oct. 27, 2013, 6 pages.

Tsagkias, et al., "Language Intent Models for Inferring User Browsing Behavior", In Proceedings of the 35th international ACM SIGIR conference on Research and development in information retrieval, Aug. 12, 2012, 10 pages.

* cited by examiner

EXTENSION OF THIRD PARTY APPLICATION FUNCTIONALITY FOR INTENT DETERMINATION

BACKGROUND

Applications that are implemented on devices operating in communications networks are becoming increasingly sophisticated as far as the functions and services that they offer to users. Examples of such applications include personal digital assistants and search engines that are able to process input queries in the form of speech or text and provide answers to questions or facilitate performance of relevant functions for the user of a device. The processing of input queries is done by functions that are able to perform natural language understanding (NLU) processing on the input queries and provide an intent determination so the application can function according to the user's desires. Several current major mobile device manufacturers and operating system (OS) providers include a personal digital assistant application that is integrated into the OS of their devices.

The NLU processing and intent determination for an application is typically mainly performed in a server system/infrastructure that is designed, constructed and maintained by the application provider. The design, construction and maintenance of a server system that provides quality NLU processing and intent determination requires a large amount of resources including experienced manpower, access to knowledge data bases, access to relevant data logs, including query and search histories, processing infrastructure, etc. An aspect of the performance of such a NLU processing and intent determination system that is widely used, for example, with a mobile device or computer operating system, is that the performance of the system benefits from a better quality and more robust system because of the availability of learning feedback loops with large amounts of data from user interactions with the system.

Device manufacturers/OS providers also have supported the increasingly and widespread use of applications created by third party developers on their devices. These third party applications provide a wide range of functions. The third party application developers are often smaller companies that cannot provide resources and processing infrastructure for enhanced NLU and intent understanding functionality.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Systems, methods and apparatus that provide intent determination as a service (IaaS) are disclosed herein. In disclosed embodiments, a third party application may be provided access to an IaaS service that is utilized to determine the intent of queries that may be associated with the third party application. The determination of the intent may then be utilized in the performance of functions or services provided by the third party application.

In example embodiments, a third party application installed on a device may access the IaaS system. Access may be realized though registration of the application with the IaaS system. Registration may include exchange of data and information between, or configuration of data and information in, the IaaS system and the third party application/device that allow configuration of data and interfaces for provision of the IaaS services to the third party application. A query received as input at the third party application may be sent to the IaaS system. The intent of a query may be determined by the IaaS system and indicated to the third party application in a query response. The application may then utilize the indicated intent to perform appropriate application functions.

In other example embodiments, a third party application installed on a device may interface with a device client, for example an application such as a personal assistant or search engine that is integrated into the operating system of the device, as part of accessing the services of a IaaS system. Access to the IaaS services may be realized by registration of the application with the device client or the IaaS service or with both. Registration may include exchange or configuration of data and information that allows the third party application, device client and the IaaS service to send and receive the appropriate signals and communications that provide the third party application access to the services of the IaaS system.

In an example implementation, a query made to the device client may be sent to the IaaS system. The intent of the query may be determined by the IaaS system and sent as a query response to the device client which forwards the query response to an appropriate third party application. Alternatively, the IaaS system may send the response to a query received from the device client directly to an appropriate third party application. The third party application may then utilize the intent indicated in the query response to perform functions. In another example implementation, the device client may send a relevant query to the third party application and the third party application may then communicate with the IaaS system in sending the query and receiving a query response.

Embodiments of the IaaS system may be configured to include functions and tools that allow a third party application provider to configure and input relevant intent determination domain models into the IaaS system. The functions and tools may include authorization, and/or validation procedures that maintain a desired security and quality level for the IaaS system.

DETAILED DESCRIPTION

The system, method and apparatus will now be described by use of example embodiments. The example embodiments are presented in this disclosure for illustrative purposes, and not intended to be restrictive or limiting on the scope of the disclosure or the claims presented herein.

The technologies and techniques that are described herein provide embodiments of an intent as a service (IaaS) system. Third party applications may interact with the IaaS system in such a manner that the third party applications are able to offer users services and functions that require intent determination while relying on the resources, infrastructure, and scaling capability of the IaaS system. The functionality of a third party application may be enhanced by the increased functionality and efficiency of having the intent determination service designed, maintained and provided by another party that has access to greater resources and experience in intent determination services. This results in enhanced reliability for the third party applications when utilizing intent determination. It also may provide a reduced error rate for intent determination, for example, more accurate and quicker intent determination from processing a query. Use of learning feedback loops and query mining for updating and creating new models used in intent determination may provide third party applications and the IaaS system with increased functionality and efficiency through the cumulative benefits of having other applications, including other third party applications, using a range of different domains and intents on the same IaaS system together and providing input to the feedback learning loops.

An IaaS system according to the disclosure may provide availability and access to the IaaS system functions over a broad scope of domains, intents, and task completion slots for third party applications in a variety of supported languages. The IaaS system may also allow third party applications to make use of multiple explicit and implicit sources of signals and/or data indicating intent including speech, text, gaze tracking, visual recognition, touch, gesture, location, user context, session context, and user inferences that may be analyzed and interpreted using the IaaS system resources. In some embodiments of the IaaS system, third party models including domain, intent and slot models, may be integrated into the IaaS system in association with one or more third party applications that are provided access to system services. This may increase the efficiency and functionality of both of the third party applications and the system. Use of third party models and the ability to use the models on the IaaS system also extends third party model capabilities and effectiveness by expanding the base of knowledge sources that may be accessed and used by the model.

A third party application may utilize the IaaS system by accessing the IaaS system from the third party application itself or by accessing the IaaS system in conjunction with another application, for example, a device client integrated into the operating system of a device, such as a search engine client or personal assistant. Integration of a device client into the OS of a device may be implemented by including the code for the client as part of the OS code so that the client may be downloaded upon installation or updating of the OS. Alternately, a device client may be a separate module on a device that communicates with the IaaS system and third party applications to provide the functions of the embodiments.

Use of the IaaS system by a third party application in conjunction with a device client extends the functionality and efficiency of both the third party application and the device client. This provides an extension of capability for both device clients and third party applications, for example, in the number of services that may be provided by the device client or by the third party application. The capabilities of a device client may be extended to include the functions of third party applications. This allows the device client to provide intent services across the larger scope of functions provided by the third party applications resulting in improved usability. During a single user session, the device client may provide access within the single session across multiple domains to the services of multiple third party applications that are available through the IaaS system.

Third party applications also benefit from inclusion in the ecosystem of the device client/IaaS system through the added functional capability of being able to interact with a larger base of users for providing services. The IaaS system may include registration, authorization, and/or validation procedures that maintain a security and quality level when new third party users and models are added to the IaaS system.

Figure 1:
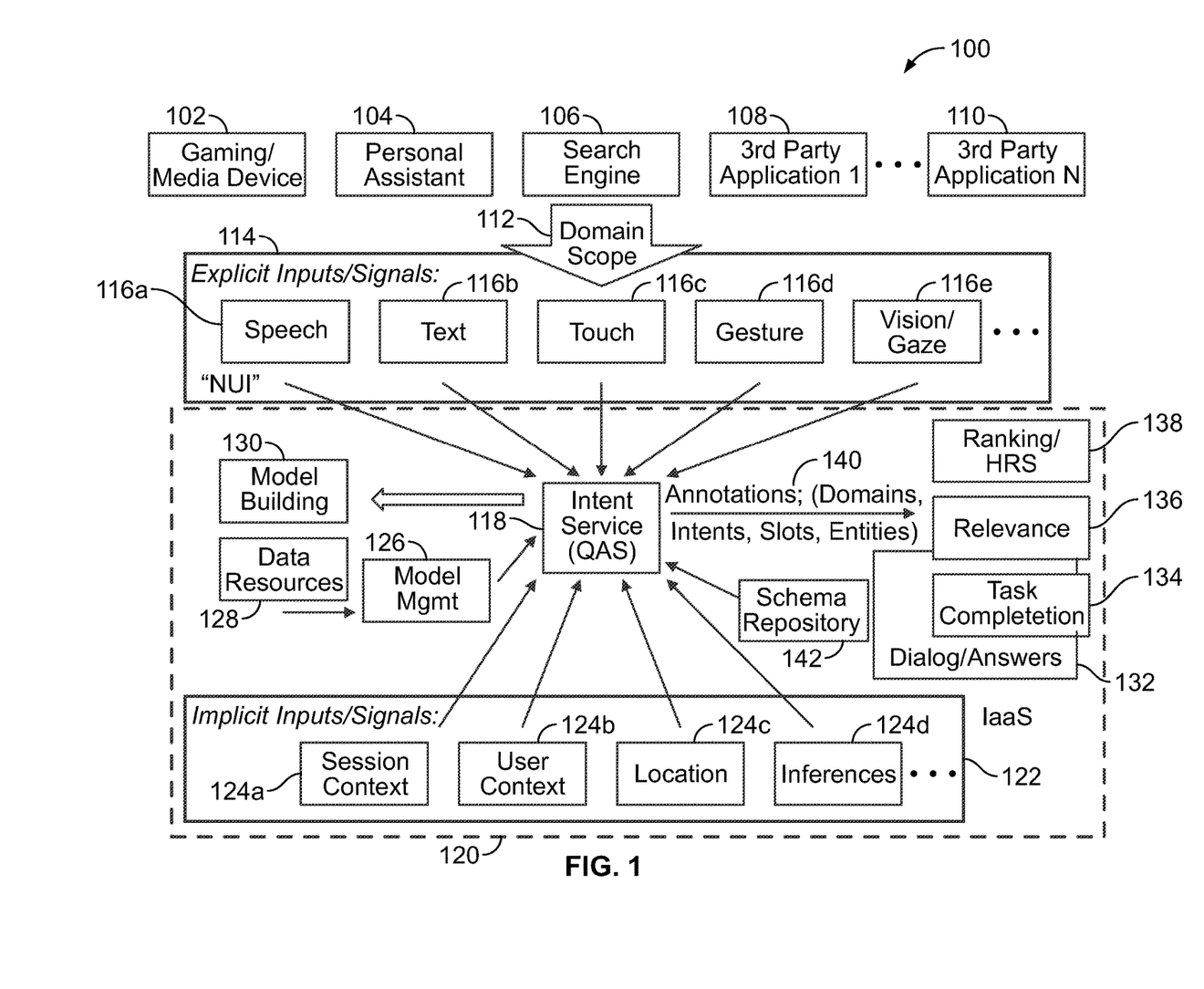
FIG. 1 is a simplified block diagram of a network including an embodiment of an intent determination as a service (IaaS) system.

Referring now to FIG. 1, therein is a simplified block diagram of an example network in which an embodiment of an intent determination as a service (IaaS) system is implemented. Network 100 includes IaaS system 120 that provides intent determination over a domain scope 112 illustrated to include Gaming/media devices 102, personal assistant client 104, search engine client 106, and third party applications 108-110, within the network.

In the embodiment of FIG. 1, IaaS system 120 may be specifically configured to operate with the operating system of particular devices in the network and with device clients embedded in the operating systems of those devices. For example, personal assistant client 104 and search engine client 106 may be provided by the entity that provides the OS on which the personal assistant and search engine client are implemented and also provides the IaaS system 120. In the embodiment, IaaS system 120 may also be configured and adapted to provide the intent determination as a service (IaaS) to third parties. For example, IaaS system 120 may provide intent determination as, for example, a web based service, to third party application 108 and third party application 110.

IaaS system 120 may receive queries or query information in the form of explicit inputs or signals 114 generated from user input at gaming media device 102, personal assistant 104, search engine client 106, third party application 108 and third party application 110, or other types of devices or applications. Explicit inputs/signals may include, for example, speech 116*a*, text 116*b*, touch 116*c*, gesture 116*d*, and vision/gaze 116*e* inputs received at a user input of a device or application in network 100.

The queries received at IaaS system 120 may be in a format including raw data, such as raw speech input, that is fed directly to IaaS system 120 or in other formats, such a structured semantic schema configured at the sending application. IaaS system 120 may also receive queries or query information in a format including, or packaged with, implicit inputs or signals 122, such as, for example, location information 124*c*, received from a device. Implicit inputs or signals 122, such as, for example, session context information 124*a*, user context information 124*b*, or inferences 124*d*, may also be received or generated by IaaS system 120 from relevant data. The term Query as used in this disclosure means any signal, including any type of implicit or explicit input/signal, or packaged information, such as context information, sent for intent determination.

The session context information 124*a* may be used by IaaS system 120 as it manages sessions. The system may be implemented so that a session is defined to be a time window including inputs/signals exchanged with one user and one device. User context information 124*b* may be used for managing interactions of a user over, for example, longer time periods than a session or over multiple devices.

The IaaS system 120 performs interpretation of queries into a format for a structured representation defined by a semantic schema 142. The query interpretation may be done by performing domain classification, intent classification and domain specific entity extraction in a context sensitive way. For example, IaaS 120 may extract, cache, and store relevant context information 122 for use in intent understanding. Dialog/answer management 132 may utilize intent/slot carryover models within a single domain or broader dialog experiences, including cross-domain carryover models for task completion 134. Dialog/answer management 132 may also support system initiated conversation for disambiguation and verification of queries and management of interaction with knowledge sources.

Ranking function 138 and relevance 136 functions are used in determining which of possible domain models of the available domain models are best suited for determination of the correct intents for a query response. Ranking function 138 may access knowledge sources in performing its functions. For example, ranking function 138 may determine the validity of query by accessing a system knowledge sources to determine if there is knowledge about the query available in the system.

Intent understanding may be performed by mapping of an extracted named entity for a slot filler to the actual entity in the information fabric context. For example, to take the proper action upon user's instruction "send Alan the LIT LRP document", the IaaS system 120 may determine which "Alan" is the right recipient and which document is "the LIT LRP document" according to context information in the personal or organizational information fabric, such as data stored in a contacts list and/or company database, on a device user or elsewhere in a network.

IaaS system 120 may include a feedback loop including functions for model building 130, data resources 128 and model management 126. A bootstrapping model may be used for training with a manually authored grammar or a machine learning (ML) model trained with auto-labeled search engine log data. The feedback loop may be used to improve the system models using online signals received from users' interactions with IaaS system 120. Third party application providers may provide models and/or data for model building.

Figure 2:
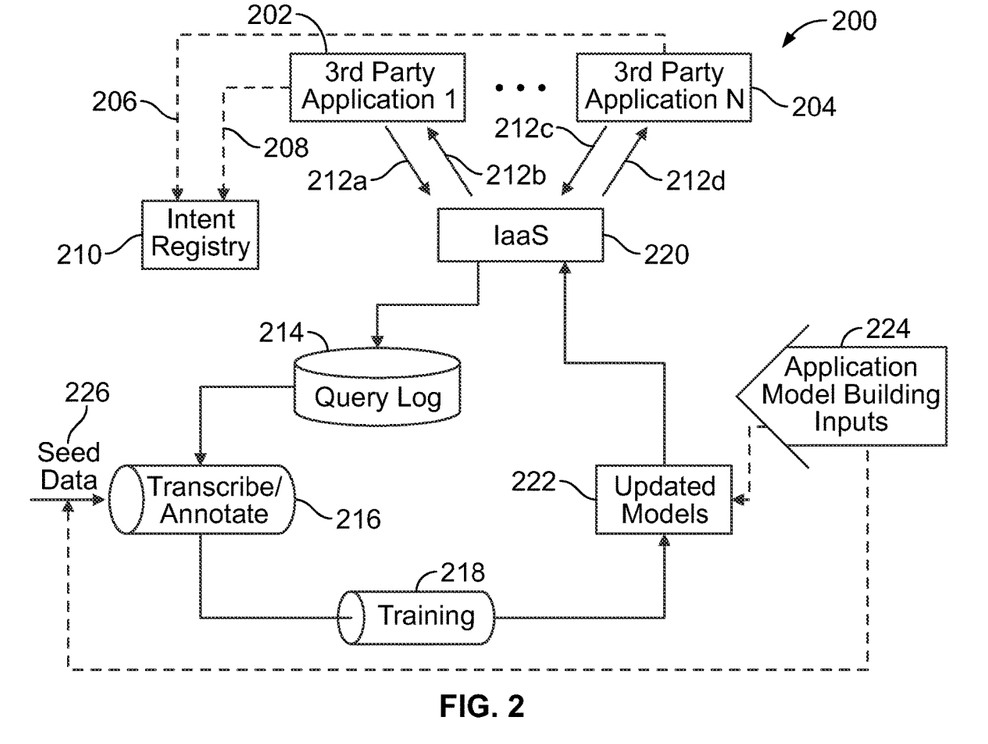
FIG. 2 is a simplified block diagram of an example IaaS system for providing intent determination for third party applications.

Referring now to FIG. 2, therein is a simplified block diagram of a network including an example IaaS system for providing intent determination to third party applications. In one example implementation, the functions of IaaS 220 shown in FIG. 2 may be implemented according to functions represented by the block diagram of IaaS 120 in FIG. 1. FIG. 2 shows IaaS system 220 interfacing with third party application 202 and third party application 204. While two third party applications are shown in FIG. 2, IaaS 220 may support any number of third party applications. The third party applications may be installed on any type of device operating in any type of telecommunications network. The third party applications are applications that are developed, deployed or maintained by a vendor or entity other than the operator/provider of the IaaS system. The third party applications may be any type of application that requires or utilizes intent determination. IaaS 220 may also include intent registry 210 for storage of information associated with third party applications that may be used by IaaS 220 in processing queries.

The IaaS system 220 may include a feedback loop for updating and building intent determination models that includes query log 214, transcribe/annotate function 216, training function 218 and updated model database 222. The feedback loop may provide the functions provided by model building function 130, data resources 128 and model management function 126 of IaaS system 120 of FIG. 1. The feedback loop may receive data input as seed data 226 as, for example, sample queries for bootstrapping the feedback loop or as data from actual system queries logged in query log 214. The data may then be transcribed and annotated for terms and queries to be used in intent modeling. The annotated data may then be used to train the models 218. Updated models 222 may then be provided for input into IaaS 220. IaaS 220 may optionally include functions for receiving application model building inputs 224 from third party application providers for incorporation in the feedback loop.

In the implementation of FIG. 2, the service provider that operates IaaS system 220 may provide service to the third party applications, such as third party applications 202-204. System domains may be domains available for use by all third party applications using the system. For example, a restaurant domain would be provided for restaurant reservation booking applications, or a travel domain would be provided for travel reservation booking applications desiring to use the intent determination service system as third party subscribers. Any other types of domain may also be provided for any other third party application requiring intent determination services.

Figure 4A:
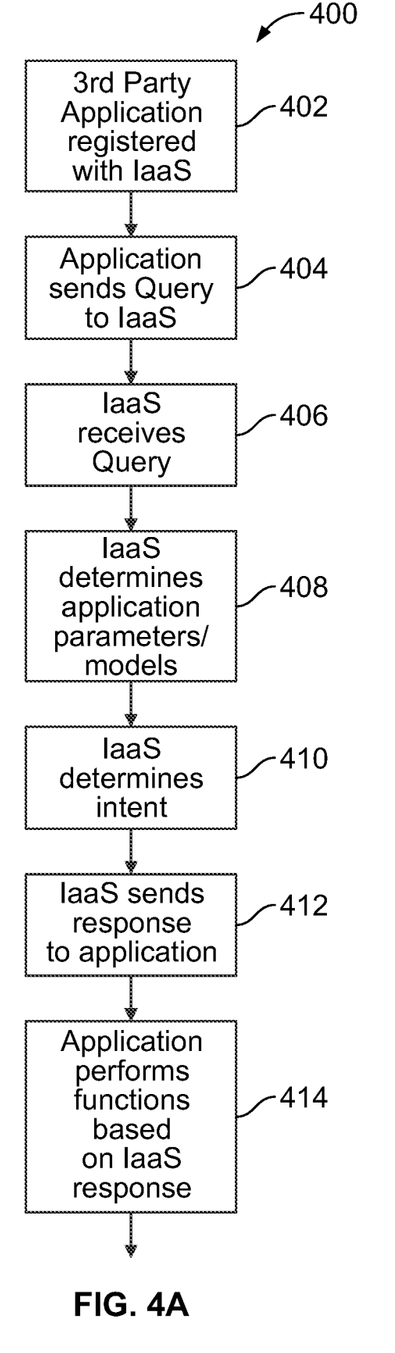
FIGS. 4A, 4B, 4C and 4D are flow diagrams illustrating operations for providing IaaS service according to example embodiments of the disclosure.

Referring now to FIG. 4A, therein is a flow diagram illustrating operations for providing IaaS service according an example implementation of FIG. 2. The process begins at 404 where third party application 202 is registered with IaaS 220. During registration IaaS 220 is configured to receive information relating to third party application 202 and provide information to third party application 202. Registration as used in this disclosure means receiving any information associated with a third party application in the IaaS system where the information is used for provision of services by the IaaS system.

Registration may include any exchange of data and information between, or receiving data and information in, the IaaS system 220 and/or the third party application 202 that allows configuration of data and interfaces in IaaS 220 and in third party application 202 for provision of the IaaS services to the third party application. This includes information for identifying and associating third party application 202 with a domain or domains of IaaS 220, for example, in intent register 210, configuring APIs and interfaces for signal exchanges between third party application 202 and IaaS system 220, and the determination of a format or structure for a semantic schema, used for communication of queries or query responses. The registration at 402 may be done manually or be automated, or be done by a combination of automated or manual operations. The registration may be done over a web service. Registration may include that third party application 202 send information that includes intent information about the third party application 202 for storing in intent registry 210. The intent information may be used to indicate a domain for a particular application. For example, a restaurant booking application may be associated in intent registry 210 with restaurant booking applications or a travel reservation application may be associated in intent registry 210 with travel booking applications At 404, upon receiving input that requires intent determination, third party application 202 sends a query to IaaS 220. At 406, IaaS system 220 receives the query 212a and processes the speech input. At 408, IaaS system 220 determines third party application 202 parameters and models from the intent registry 210, processes the query 212a using the information indicating that the query is relevant for a particular domain. IaaS 220 then determines the intent of the query at 410 and configures a query response that indicates the determined intent of the query. At 412 IaaS 220 sends the query response 212b to third party application 202. At 414, third party application 202 then interprets the query response 212b and processes the request by performing the appropriate function. The query and/or query response may be, for example, in an XML format, in a format for HTML that is defined as part of the IaaS service or that is a format for HTML customized for the third party application.

In an example implementation of FIG. 4A, the third party application 202 may be configured on a device to include speech processing capability allowing application 202 to send a coded speech signal to IaaS 220, or alternately, third party application 202 may pass raw speech as a query to IaaS 220 where the speech is decoded For example, at 404 third party application 202 may utilize a device microphone to receive and pass speech including a query 212a through to IaaS 220. Alternately, third party application 202 may create an audio file from user voice input as query 212a and pass the audio file to IaaS 220. As an example, a user may ask third party application 202 to "book a table for 4 at 5 pm at an Italian restaurant this evening". At 406, IaaS system 220 receives the query 212a and processes the speech input.

At 408, IaaS system 220 determines third party application 202 parameters and models. For example, IaaS system 220 may determine that third party application 202 is a restaurant reservation application from the intent registry 210, process the query 212a using the information indicating that the query is relevant for a restaurant domain. IaaS 220 then determines the intent of the query at 410 and configures a query response that indicates the determined intent of the query. The query response 212b may be in a format or a structure for a semantic schema format indicating the intent to make a reservation conforming to the criteria of: (Italian, 4 pm, 5 people). IaaS 220 may access the schema repository of IaaS 220 to determine the appropriate structure for the query response. At 412 IaaS 220 sends the query response 212b to third party application 202. At 414, third party application 202 then interprets the query response 212b from the semantic schema and processes the request by making the reservation.

In other example implementations, IaaS system 220 may also be configured to receive a query as other types of input, for example, as explicit inputs/signals 114 shown in FIG. 1 from any type of natural user interface (NUI). In certain example implementations the device operating system on which third party application 202 is installed may include, for example, vision tracking, optical character recognition, bar code reading, or gesture tracking functions that provide data to the third party application for inclusion with the query sent to IaaS 220. Alternately, third party application 202 may include functions that collect these inputs/signals themselves, from the device or from device accessories. IaaS system may also utilize other inputs, such as implicit input/signals 122, such as GPS data or context data, shown in FIG. 1 for use in determining the intent of a query.

Figure 4B:
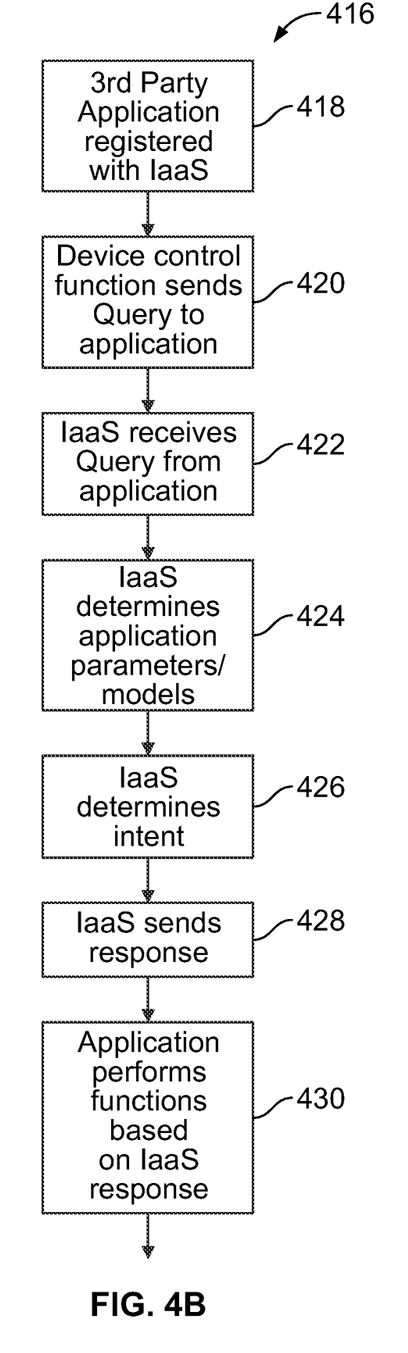

Referring now to FIG. 4B, therein is a flow diagram illustrating operations for providing IaaS service according to another example implementation of the system of FIG. 2. FIG. 4B illustrates a scenario in which third party application 202 may interface with a device control function that controls an accessory device, receive input from the device control function and interact with IaaS 220 to process the input for intent determination. Third party application may be registered with IaaS 220 at 416 of FIG. 4 to be allowed to access the intent determination services of IaaS 220. The registration at 416 may include similar operations as described previously for step 402 of FIG. 4A.

Referring again to FIG. 4B, at 420 third party application 202 receives the input/query from the device control function. At 420 third party application 202 may package the data from the accessory control function and send it as a query to IaaS 220 which receives the query at 422.

At 424, IaaS system 220 determines third party application 202 parameters and models. For example, IaaS system 220 may determine that third party application 202 is an application having a particular domain from the intent registry 210, IaaS may then process the query 212a using the information indicating that the query is relevant for an appropriate domain, IaaS 220 then determines the intent of the query at 426 and configures a query response that indicates the determined intent of the query. The query response sent from the IaaS 220 to the third party application 202 may be configured similarly to as was described for operation 410 of FIG. 4A.

At 430, third party application 202 would then interpret the query response 212b from the format of the semantic schema and process the request by performing the appropriate functions. In implementations of FIG. 4B, the query and/or query response may be, for example, in an XML format, in a format for HTML that is defined as part of the IaaS service or in a format for HTML customized for the third party application.

In an example implementation of FIG. 4B, the device control function may be a control function that controls a device accessory such as, for example, a pair of glasses equipped with voice reception capability and a vision tracking camera for optical recognition, a microphone, a camera, a data sensor, or any other accessory that may provide input to the third party application appropriate for use in intent determination. For example, a user of the accessory device may look at a restaurant in a certain location, activate third party application 202 and say, for example, "book me a table for 2 at this restaurant tonight at 7 pm". At 420, the accessory control function may then pass the voice input audio and an optically coded file including an image of the restaurant to third party application 202 Third party application 202 may package the data from the accessory control function and send it as a query to IaaS 220 which receives the query at 422. At 424, IaaS system 220 determines third party application 202's parameters and models. For example, IaaS system 220 may determine that third party application 202 is a restaurant reservation application from the intent registry 210, process the query 212a using the information indicating that the query is relevant for a restaurant domain. IaaS system 220 may use the audio and optical recognition file information, and device location information to determine the identity of the restaurant and the intent at 426, configure a query response, and return a query response 212b to third party application 202 at 428.

The query response 212b may comprise a format or a structure for a semantic schema indicating the intent to make a reservation conforming to the criteria of: (Name of restaurant, city, 4 pm, 5 people). IaaS 220 may access the schema repository of IaaS 220 to determine the appropriate structure for the query response. At 430, third party application 202 would then interpret the query response 212b from the format of the semantic schema and process the request by making the reservation.

In the example embodiments of FIG. 2, third party application providers may be provided the capability to input their domain models for use in the IaaS system 220 as model building inputs 224. The third party application providers may be allowed involvement in the model building by providing seed data 226 to transcribe/annotate function 216, or by providing models directly to updated models function 222. System 220 may include a verification/validation function that validates a third party provided model by checking that the semantic schema output by the model is compatible with the semantic schemas stored in the schema repository or otherwise used by IaaS system 220 for communicating with other clients and third party applications.

The third party provided models may be used as "public" or "private" models in IaaS 220. A public model would become available to all third party users of the intent service. A private model would be used only for the third party that provided the model. Third party models that are public provide all users of IaaS system 220, including the provider of IaaS 220 and other third party users, the benefits being able to rely on models created using the resources and expertise of others across different domains and, for example, different languages.

The quality of intent determination services provided by IaaS system 220 may be improved by the cumulative effect of a greater amount of data going into the feedback loop for learning through different third parties joining the IaaS system and/or providing models. A system default may be set to make all models input to the system public unless specifically requested by the third party model provider. A third party model provider may designate a third party model be kept private. This may be done, for example, if the model provides the third party with advantages based on the third party's experience and expertise in a particular area. Private models may also be utilized for third party application providers that provide specialized applications, such as for example, enterprise services.

Figure 3:
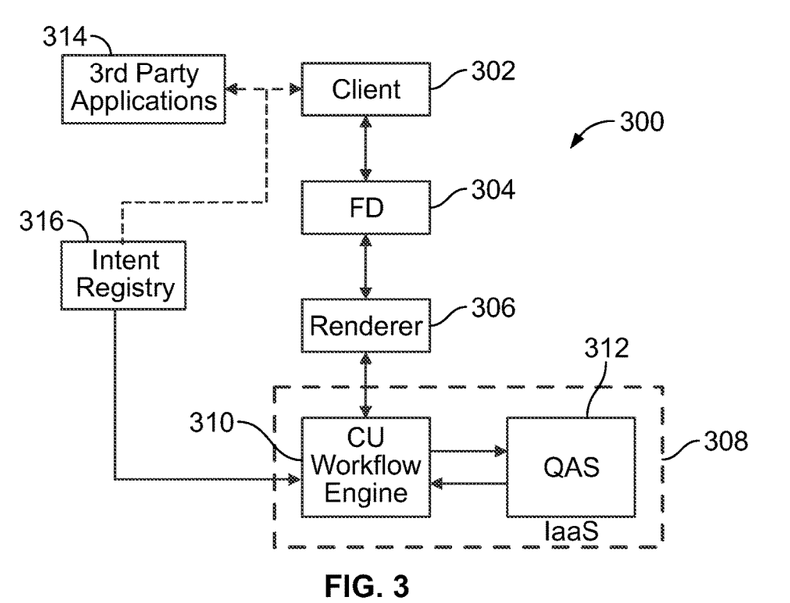
FIG. 3 is a simplified diagram of a IaaS system for providing intent determination for third party applications through a device client.

Referring now to FIG. 3, therein is a simplified diagram of a network including an example IaaS system for providing intent determination for third party applications working in conjunction with a device client. In the implementation of FIG. 3, third party application 314 interacts with device client 302 so that queries related to third party application 314 may be serviced by IaaS system 308. The implementation provides an extension of capability for client 302 and third party application 314. For example, the capabilities of client 302 are extended to include the functions of third party applications 314. This allows client 302 to provide intent services across a larger scope of functions. Third party applications also benefit from inclusion in the ecosystem to which device client 302 belongs by being able to provide functions to a larger number of users.

In one example implementation, client 302 may be integrated into the device operating system (OS) of a device on which third party application 314 is installed or be implemented in a separate software module. IaaS 308 of network 300 may be implemented similarly to IaaS 120 of FIG. 1. The third party application 314 is an application that is developed, deployed or maintained by a vendor or entity other than the operator/provider of the IaaS system 308. Device client 302 comprises application/software that may be provided by the manufacturer/supplier of the device operating system or another entity, and which may be integrated into the device operating system or implemented by a separate software module. In one example implementation the manufacturer/supplier of the device operating system may be the operator/provider of the IaaS system 308.

FIG. 3 shows IaaS 308 as including functional blocks for conversational understanding (CU) work flow 310 and query annotation service (QAS) 312. CU work flow 310 manages work flow for queries that are to be processed by QAS 312 and QAS 312 runs the models for query understanding. FIG. 3 shows front door (FD) 304 and renderer 306 as example interfaces between IaaS 308 and client 302. FD 304 provides load balancing and denial of service functions. Renderer 306 provides rendering services that format exchanged information according to the device on which client 302 and third party application 314 are located. IaaS 308 may also include the functions for a feedback loop similar to that shown in FIG. 2 by the query log 214, transcribe/annotate function 216, training function 218, updated models store 222, and application model building inputs 224, and which functions in a similar manner. In FIG. 3 the provision of intent determination services that determine intent of queries associated or related with third party application 314 provide extended capabilities to both third party application 314 and client 302.

Figure 4C:
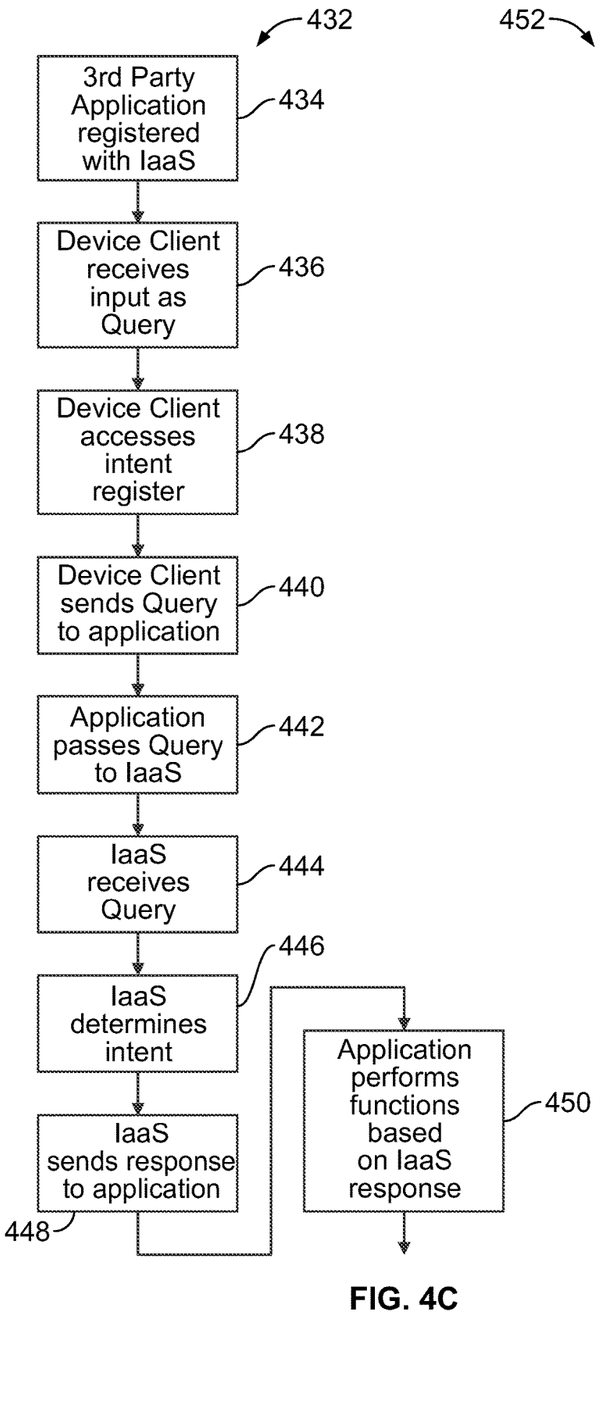
Figure 4D:
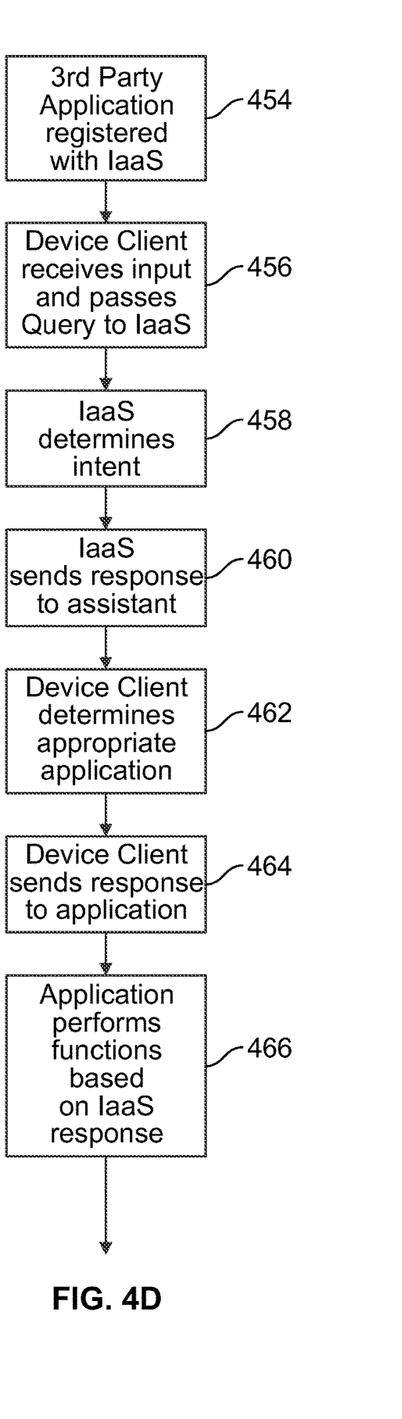

In an example implementation, client 302 may be implemented as a personal assistant that is integrated into the OS of a device on which third party application 314 is installed or implemented by a separate software module. Access to the IaaS services may be realized by registration of third party application 314 with the client 302 or with IaaS 308 or with both. Referring now to FIG. 4D, therein is a flow diagram illustrating operations for providing IaaS service according the example implementation of FIG. 3.

FIG. 4D illustrates the example in which client 302 may be interacting with third party application 314, At 454 third party application 314 is registered with IaaS 308. Registration may include exchange or configuration of data and information that allows the third party application, device client application and the IaaS service to send and receive the appropriate signals and communications that provides third party application 314 access to the services of IaaS 308.

At 456, client 302 receives a query which may be in the form of user input to the device client and sends the query to IaaS system 308. IaaS 308 receives the query and, at 458, determines the intent of the query. At 460 IaaS 308 sends a query response to the device client 302. Device client 302 receives the query and, at 462, determines that the query response is for third party application 314. Assistant 302 may make the determination at 462 using information included with the query response from IaaS 308 that identifies third party application 314 as the intended recipient. Alternately, assistant 302 may make the determination at 462 based on an indication that the query response is for a particular domain along with information within device client 302 indicating that third party application 314 is an third party application providing a function within that particular domain. Also, alternatively, assistant 302 may also access intent register 316 at 462 to determine that a query response related to the particular domain may be sent to third party application 314. The third party application may be any type of application that such as, for example, a restaurant reservation application, a travel reservation application, calendar application, or any other type of third party application that may act to perform functions in response to the query response.

In cases where assistant 302 is operating on a device with more than one third party application providing the same function installed, for example, two or more restaurant applications, a feature may be implemented in the user interface of assistant 302 to prompt a user to determine which application from a choice of available third party reservation applications will be sent the query response. This determination feature may be used for any situation in which multiple applications of the same domain may be selected from.

In an alternative, in the situation in which multiple applications of the same domain may be selected from, IaaS system 308 may choose the third party application before the query response is sent. This may be done by using any relevant data or context information, for example, the IaaS system 308 may determine that a particular third party application is best suited to make a restaurant reservation because the application has indicated to the system that it has priority rights over other reservation applications in the country or area in which the device is located. In another alternative the IaaS ranker may have determined over time that one application performs a function better or completes tasks better than others.

Upon determination that third party application 314 is the correct application to receive the query response assistant 302 may send the query response to third party application 314 at 464. The query response may comprise a response in the format of a predetermined structure defined by a semantic schema indicating the intent to make a reservation conforming to the criteria of the query. IaaS 308 may access the schema repository of IaaS 308 to determine the appropriate structure for the query response to assistant 302 that may be forwarded to third party client 314. Third party application 314 may then process the query response as appropriate. In implementations of FIG. 4D, the query and/or query response may be, for example, in a format, such as, an XML format, an HTML format that is defined as part of the IaaS service or, a format for HTML customized for the third party application.

Alternatively, the IaaS system 308 may send the response to a query received from the device client application 302 directly to the third party application 314. The third party application 314 may then utilize the intent indicated in the query response to perform appropriate functions.

In implementations of FIG. 3, a device user may have a session with the device client 302 and within the single session may be provided access across multiple domains to the services of multiple third party applications that are available through the IaaS system 308. For example, a personal assistant, as device client 302, may receive input instructing the device client 302 to "Book a taxi to the airport at 2 pm, book a flight to Seattle at 4 pm and reserve a table at an Italian restaurant in Seattle at 7 pm". The device client could then interact with the IaaS system 308 to determine the appropriate intents and send query responses for a taxi reservation application, a flight reservation application, and a restaurant reservation application.

In another alternative, client 302 may interface with third party application 314 and third party application 314 may access IaaS system 308. FIG. 4C shows an example in which client 302 interacts with third party application 314. The process begins at 434 where third party application 314 is registered with IaaS 308. Registration may include exchange or configuration of data and information that allows the third party application, device client application and the IaaS service to send and receive the appropriate signals and communications that provides third party application 314 access to the services of IaaS 308 through the operations of FIG. 4C.

At 436, client 302 receives a query which may be in the form of user input at the device requesting that a particular task or action be performed. Client 302 may then determine that the query may be forwarded to third party application 314 by accessing intent register 316 at 438 and determining that third party application 314 handles queries in the appropriate domain. Client 302 may configure and package the query by managing a dialog with a user. For example, client 302 may provide a series of questions to the user to elicit responses that include information that may provide a query that includes complete information for the query If intent register 316 indicates that the device on which client 302 is operating has multiple applications installed that are associated with the same domain for a particular task or function, client 302 may offer the user of the device to choose from a user interface which application they want to use. At 440, client 302 sends the query information to third party application 314.

At 442 third party application configures and sends the query to IaaS system 308. IaaS 308 receives the query at 444 and, at 446, determines the intent of the query. At 448 IaaS 308 send the query response to third party application 314. The query response may comprise a response in a format for a structure for a semantic schema format indicating the intent to make a reservation conforming to the criteria of the query. IaaS 308 may access the schema repository of IaaS 308 to determine the appropriate structure for the query response to third party client 314. Third party application 314 may then process the query response as appropriate. The query and/or query response be, for example, in a XML format, a format for HTML that is defined as part of the IaaS service or format for HTML that is customized for the third party application.

Figure 5:
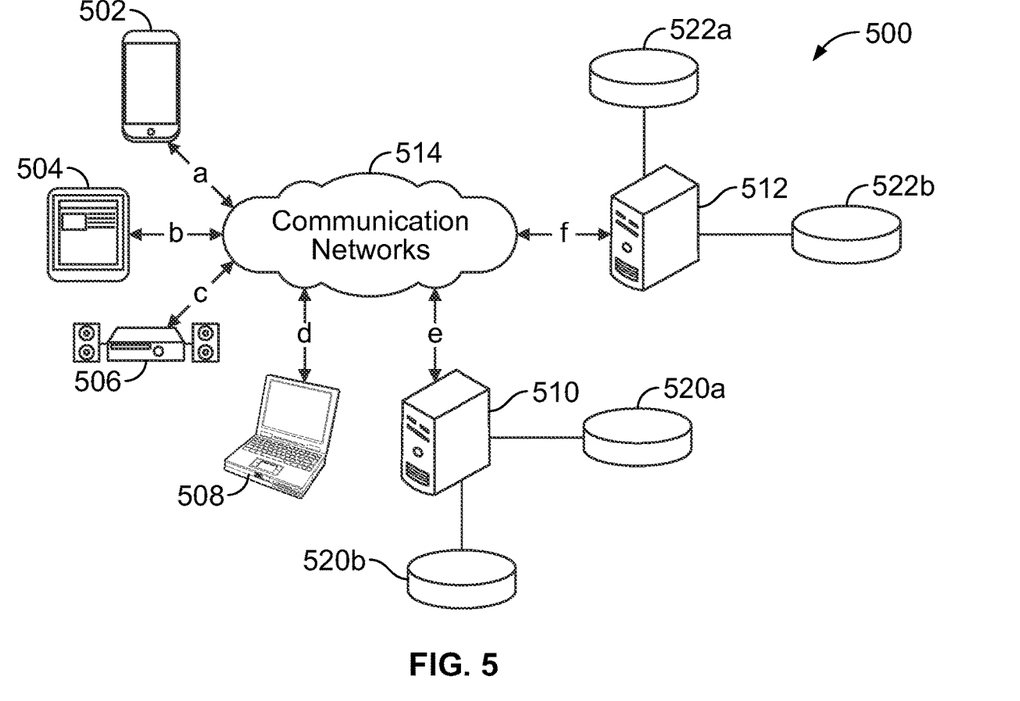
FIG. 5 illustrates a network into which a IaaS system according to example embodiments of the disclosure may be implemented.

Referring now to FIG. 5, therein is illustrated an example system 500 in which embodiments of this disclosure may be implemented. In FIG. 5, system 500 is shown as including communication networks 514, a server 510 that is coupled to storage devices 520*a* and 520*b*, a server 512 that is coupled to storage devices 522*a* and 522*b*, mobile device 502, mobile device 504, laptop computer device 508 and gaming/media device 506. Servers 510 and 512 are illustrated as single servers but each may be representative of server functions or server systems provided by one or more servers or computing devices that may be co-located or geographically dispersed. The term server as used in the present disclosure is used generally to include any computing devices or communications equipment that maybe implemented to perform the functions and processes of the IaaS system of the disclosed embodiments. Also, while devices 502-508 are shown as implemented as an example smart phone, a tablet computer, a Gaming/media device and a laptop computer device, respectively, each of the example devices 502-508 may be alternatively implemented as any other type of device, or number of devices, or system that may be configured with functionality supporting the third party applications, the device clients and the IaaS processes disclosed herein. These other types of devices include for example, a desktop personal computer (PC), a smart television, a home theater system, a smart automobile system, a smart house system, a multimedia cable/television box, a smart phone accessory device, a tablet accessory device, a personal digital assistant (PDA), a portable media player, a smart watch, an industrial control system, etc.

In an example implementation, the functions provided by IaaS system 120 of FIG. 1 may be implemented on a server such as server 510 and/or server 512. Each of devices 502-508 may be configured to include third party applications that access and utilize the IaaS system 120. The third party applications are then able to incorporate intent determination in the functions and services provided to users of devices 502-508.

Servers 510 and 512 each may include one or more processors, or processing units, and memory, or other types of storage medium, including instructions in the form of code which when executed controls the server to implement the functions and processes of the example embodiments of the IaaS system. The communications networks 514 provide connectivity for communications between device 502-508, servers 510 and 512, and other devices that may be connected to communications networks 514. Communication networks 514 may include one or more internet protocol (IP) networks comprising routers and switches for routing internet traffic carried in IP data packets and is not limited to a particular type of network. For example, communications networks 514 may include one or more wide area networks (WANs) or one or more local area networks (LANs) implemented in LAN topologies using a protocol such, for example, as Ethernet, TCP/IP, Frame Relay, Ethernet, FTP, HTTP, or a similar protocol.

Communication network 514 also may include one or more wireless or landline networks that provide the network interfaces shown at interfaces a-f, respectively, for device 502-508 and servers 510 and 512 to communications network 514, so the various devices can communicate with each other over communication network 514. The wireless or landline networks of communications networks 514 that provide interfaces a-f may be comprised of any type of network that provides an appropriate network interface. For example interfaces a and b for device 502 and device 502 may be implemented on a wireless channel provided by a cellular network or on a Wi-Fi channel provided by a Wi-Fi access point of communications networks 514. Also, the interfaces c and d which interface to device 506 and laptop 508 may be implemented over Wi-Fi, and interfaces e and f to servers 510 and 512 may be implemented over high speed fiber optic cable that connect servers 510 and 512 to the one or more IP networks of communications networks 514. Also, communications network 514 may include a Public Switched Telephone Network (PSTN) having land-line and cellular telephone terminals, or a network featuring a combination of any of the above mentioned networks.

Figure 6A:
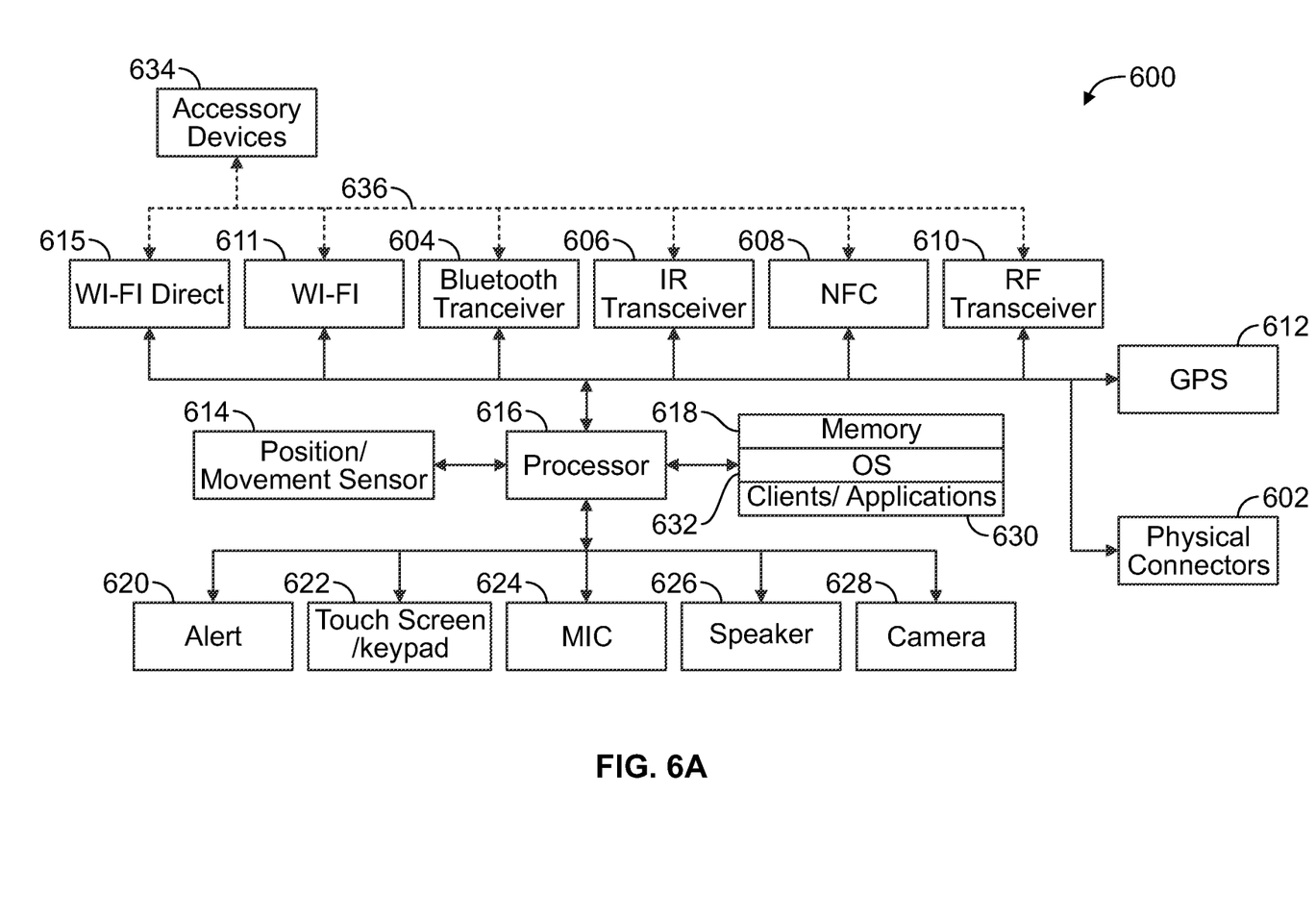
FIG. 6A is a block diagram of an example device which may be implemented in the system of FIG. 5; and, FIG. 6B is a block diagram of an example server which may be implemented in the system of FIG. 5.

Referring now to FIG. 6A, therein is an example block diagram of a device 600, according to which one or more of devices 502-508 of FIG. 5, or alternative implementations of the devices of FIG. 5, may be implemented. Various individual implementations of the devices 502-508 may differ and may each include more or less functions than, or variations of, the functionality shown by the blocks in FIG. 6A. Device 600 may include processor 616, which, while shown as one functional block, may be implemented by one or more processors or other circuitry. Use of the term processer in this disclosure is meant to cover all such implementations. Device 600 also includes memory 618 which may be implemented as any type of storage in device 600, including non-volatile and volatile memory. Memory 618 includes instructions in the form of code for running the operating system, applications, and third party applications in conjunction with processor 616 to control the operations of device 600. Memory 618 also may include data such as media data, camera photos and videos, contact data, calendar data, and other files used in the operation of third party applications on device 600 that utilize an IaaS system. For example, information stored in memory 618 may be used as the implicit inputs/signals 122 shown in FIG. 1.

Device 600 may also include operating system (OS) 632 and client/applications 630, that provide functions which are implemented by processer 616 and execution of code in memory 618, such as personal assistant 104 and third party application 108 of FIG. 1. In an implementation, processor 616, memory 618 and client/applications 630 may be configured to control the device to implement the APIs, the communications processing and interfaces, and the signal exchanges that allow third party applications installed on the device to access and utilize an IaaS system such as IaaS system 120.

Processor 616 controls data reception and transmission over communication interfaces that may include, for example, physical connectors 602, Bluetooth transceiver 604, infrared (IR) transceiver 606, near field communications (NFC) function 608, RF transceiver 610, Wi-Fi interface 611 or Wi-Fi-direct interface 615. Processor 616 may also interface with and control global positioning service (GPS) receiver 612 and position/movement sensor 614 that may be utilized to provide implicit inputs/signals to a system such as IaaS system 120 of FIG. 1. Position/movement sensor may include an accelerometer or gyroscope.

Device 600 may also include accessory devices 634 that communicate with the device over one or more of the communication interfaces. Accessory devices may include, for example, headsets, a pair of glasses equipped with voice reception capability and a vision tracking camera for optical recognition, a smart watch, or any other type of accessory device that communicates with device 600. RF transceiver 610 and Wi-Fi 611 may enable wireless communication and file transfer with other devices or networks, such as network 604 according to various communication technologies, such as, for example, LTE, CDMA, TDMA or GSM/UMTS cellular, and IEEE 802.11 Wi-Fi, or other wireless technologies. Bluetooth transceiver 604 provides short-range-RF communications with other Bluetooth or Bluetooth low energy (LE) capable devices. Wi-Fi-direct interface 615 may also provide short range communication with other Wi-Fi-direct capable devices and near field communications (NFC) function 608 provides short range communications capabilities with other devices equipped with NFC. Physical connectors 202 may be used to enable data connections and transfer of data through a physical communication interface connection.

Processor 616 may communicate with and control alert 620, which may be a vibrator or audio alert, a touch screen/keypad 622, a speaker 626, a microphone 624, and a camera 628. The touchscreen/keypad 622 may be implemented as a user interface, for example as a separate touchscreen or keypad, or as a touch screen, that may have a virtual keypad capability, and that may interact with client/applications 630 and other functions of device 600 to allow a user to input commands and selections. The user may use touchscreen/keypad 622, for example, to manage and control interaction with IaaS services at servers 110 or 112 or to manage communications on appropriate communications interfaces with the services and other devices in the system according to the processes described herein.

The various alternative implementations of user interfaces that may also be used in the processes described herein also include interfaces usable with devices such as device 600 that may provide explicit inputs or signals, such as those of natural user interface (NUI) 114, as input to IaaS system 120 of FIG. 1. This includes, for example, audio/speech recognition from speech received at MIC 624, gesture sensing or recognition at touch screen/keypad 622, positioning/movement sensing at sensors 214, or interfaces using camera image recognition or bar code recognition at camera 628, or any other type of interface by which a user may provide input to device 600 for sending to IaaS 128. Device 600 may also provide information to IaaS system 120 that is used as the implicit inputs/signals 122 to IaaS 128 of FIG. 1, such as device location information from GPS 612. NUI means any interface technology that enables a user to interact with a device in a "natural" manner.

Figure 6B:
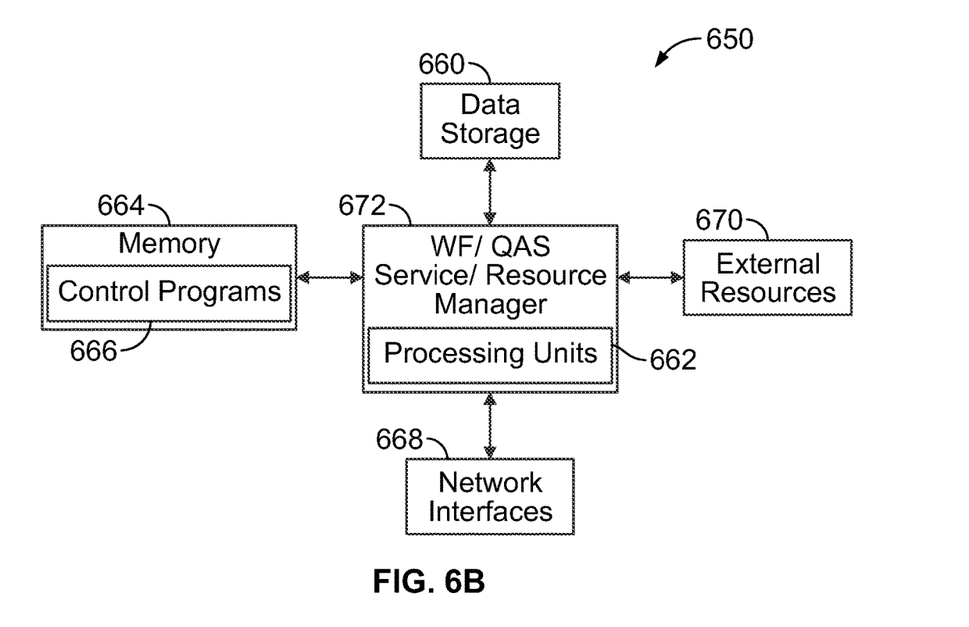

Referring now to FIG. 6B, therein is illustrated an example block diagram of a server according to which one or both of server 510 or server 512 of FIG. 5 may be configured when an IaaS system such as IaaS system 120 of FIG. 1 is implemented in the network 500. Various implementations of server 510 or 512 may differ and may each include more or less functions than, or variations of, the functionality shown by the blocks in FIG. 6B. Server 650 includes data storage 660, network interfaces 668, work flow (WF)/QAS service/resource manager 672, and memory 664. WF/QAS Service/resource manager 662 may include a processor or processing units 662, and, memory 664 may include control programs 666 for implementing the functions of the IaaS system 120 of FIG. 1. Processor or processing unit may comprise one or more processors or processing units. Network interfaces 668 may comprise any type of interface that provides capability to server 650 to communicate and exchange data with clients/applications and third party applications on devices, such as devices 502-508, and other servers/databases over communications networks 504. Memory 664 may be implemented as any type or number of storage devices, including non-volatile and volatile memory. Memory 664 includes instructions and control programs 666 in the form of code for the managing of WF/QAS services and resources of a service such as that of IaaS system 120 and for the performing of other functions in conjunction with WF/QAS service/resource manager 672 and processing unit 662.

The example embodiments disclosed herein may be described in the general context of processor-executable code or instructions stored on memory that may comprise one or more computer readable storage media (e.g., tangible non-transitory computer-readable storage media such as memory 618 or 664). As should be readily understood, the terms "computer-readable storage media" or "non-transitory computer-readable media" include the media for storing of data, code and programming instructions, such as memory 618 or 664, and do not include portions of the media for storing transitory propagated or modulated data communication signals.

The present disclosure provides embodiments including a system providing intent determination services in a network. The system includes an apparatus comprising a processor and memory including code. The code is executable to cause the processor to control the apparatus to receive information associated with a third party application, the information for provision of intent determination services, receive a query, determine an intent of the query, configure a query response indicating the intent of the query, the query response in a format configured for the third party application, and send the query response. In further embodiments, the embodiment of the system described in this paragraph may be combined with one or more of the alternatives in the following paragraphs.

In an alternative implementation of the system described in the previous paragraph the information is associated with registration of the third party application and the information is received over a web service.

In a further alternative implementation of the system the code is executable to cause the processor to further control the apparatus to send information associated with registration of the third party application to indicate a format to be used for configuring query responses for the third party application.

In another alternative implementation of the system, the received information includes model building inputs associated with the third party application and the processor configures the system to utilize models created from the model building inputs for intent determination.

In another implementation of the system, the apparatus is implemented in a server, the processor comprises a first processor, and the system further comprises a device including a second processor and memory including code. The code is executable to cause a device client to receive a query generated at the device client and send the query to the apparatus. The apparatus is controlled to receive a query by receiving the query from the device client and send the query response by sending the query response to the device.

While embodiments have been disclosed as having functions implemented on servers and/or devices operating in a network, one or more of the functions may be implemented on different types of equipment. For example, one or more of the functions in the IaaS system shown as implemented on a server located in network infrastructure may be implemented on a device, such as mobile device, laptop computer or any other suitable device operating in a network.

While the functionality disclosed herein has been described by illustrative example using descriptions of the various components and devices of embodiments by referring to functional blocks and processors or processing units, and memory including instructions and code, the functions and processes of the embodiments may be implemented and performed using any type of processor, circuitry or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the communication process, these elements, and operations may be replaced by any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A system providing intent determination services in a network, the system including an apparatus-comprising:
a processor; and
a memory storing computer-executable instructions that, when executed by the processor, cause the processor to control the apparatus to:
receive first intent registry information associated with a first third party application;
following receipt of the first intent registry information associated with the first third party application, receive a first query from the first third party application;
determine that the first query is relevant to a first domain based on the first intent registry information;
determine a first intent of the first query based at least on the determined first domain;
configure a first response comprising at least the first intent of the first query, wherein the first response is configured to be suitable for the first third party application based on the first intent registry information;
send the first response to the first third party application to enable the first third party application to produce a reply to the first query;
receive second intent registry information associated with a second third party application;
following receipt of the second intent registry information associated with the second third party application, receive a second query from the second third party application;
determine that the second query is relevant to a second domain based on the second intent registry information;
determine a second intent of the second query based at least on the determined second domain;
configure a second response comprising at least the second intent of the second query, wherein the second response is configured to be suitable for the second third party application based on the second intent registry information; and
send the second response to the second third party application to enable the second third party application to produce a reply to the second query.

2. The system of claim 1, wherein the apparatus is implemented in a server, the processor comprises a first processor, and the system further comprises a client device including:
a second processor; and
memory storing instructions that when executed by the second processor, cause the client device to:
receive the first query from a user;
access the first intent registry information from an intent register; and
send the first intent registry information and the first query to the apparatus.

3. The system of claim 1, wherein the memory stores instructions that when executed by the processor cause the processor to further control the apparatus to receive schema information of the first third party application, the schema information comprising a format to be used for configuring responses for the first third party application.

4. The system of claim 1, wherein
the memory stores instructions that when executed by the processor cause the processor to control the apparatus to:
send the second response to a client device on which the first and the second third party applications are implemented, the second response further comprising information that is useable by the client device to determine which of the first or the second third party applications is to receive the second response.

5. The system of claim 1, wherein the memory stores instructions that when executed by the processor cause the processor to further control the apparatus to:
receive model building inputs associated with the first third party application; and
utilize models created from the model building inputs to determine, by the system, the first intent of the query from the first third party application.

6. The system of claim 5, wherein:
the model building inputs include a domain model associated with the first third party application; and
the memory stores instructions that when executed by the processor cause the processor to further control the apparatus to execute the domain model while providing the domain model access to knowledge sources created from operation of the intent determination service.

7. The system of claim 1, wherein the memory stores instructions that when executed by the processor cause the processor to further control the apparatus to store the determined first intent of the query from the first third party application in an intent registry.

8. The system of claim 1, wherein the memory stores instructions that when executed by the processor cause the processor to further control the apparatus to store an indication of a format to be used for responses to the first third party application in a schema repository.

9. The system of claim 1, wherein a format of the response is based on a domain associated with the third party application.

10. The system of claim 1, wherein the apparatus is implemented in a server, the processor comprises a first processor, and the system further comprises a client device including:
a second processor; and
memory storing instructions that when executed by the second processor, cause the client device to:
receive the query from a user;
determine whether to send the query to the apparatus for the intent determination services;
when it is determined to send the query to the apparatus, access the intent registry information from an intent register; and
send the intent registry information and the query to the apparatus.

11. A device for use in an intent determination as a service (IaaS) system, the device comprising:
a processor; and
memory storing instructions that when executed by the processor cause the processor to:
receive a query from a third party application registered with the IaaS system;
receive intent registry information associated with the third party application;
determine that the query is suitable for handling by the third party application based at least in part on the intent registry information;

receive model building inputs associated with the third party application;

determine one or more domain models associated with the query based on the model building inputs;

execute the one or more domain models while providing the one or more domain models access to knowledge sources created from operation of the intent determination as a service system;

based on the determined one or more domain models, determine an intent of the query;

configure a response comprising at least the intent of the query from the third party application, wherein the response is in a format suitable for the third party application; and send the response to the third party application to enable the third party application to reply to the query.

12. The device of claim 11, wherein the one or more domain models are received from one or more third party applications.

13. The device of claim 11, wherein the query is received from a client device that comprises a personal assistant.

14. A method for providing intent determination services by an Intent as a Service (IaaS) system in a network, the method-comprising:

receiving first intent registry information associated with the first third party application;

following receipt of the first intent registry information associated with the first third party application, receiving a first query from the first third party application;

determining that the first query is relevant to a first domain based on the first intent registry information;

determining a first intent of the first query based at least on the determined first domain;

configuring a first response comprising at least the first intent of the first query, wherein the first response is configured for the first third party application based on the first intent registry information;

sending the first response to the first third party application to enable the first third party application to produce a reply to the first query;

receiving second intent registry information associated with the second third party application;

following receipt of the second intent registry information associated with the second third party application, receiving a second query from the second third party application;

determining that the second query is relevant to a second domain based on the second intent registry information;

determining a second intent of the second query based at least on the determined second domain;

configuring a second response comprising at least the second intent of the second query, wherein the second response is configured for the second third party application based on the second intent registry information; and sending the second response to the second third party application to enable the second third party application to produce a reply to the second query.

15. The method of claim 14 further comprising accessing a schema repository of the IaaS system to determine a structure for the first response.

16. The method of claim 14 further comprising:

receiving, at the IaaS system, model building inputs associated with the first third party application; and utilizing models created from the model building inputs to determine, by the IaaS system, the first intent of the first query from the first third party application.

17. The method of claim 16 further comprising:

determining parameters for the first third party application from an intent registry.

18. The method of claim 14 further comprising:

determining that the first third party application is not capable of determining the intent of the first query.

19. The method of claim 14 further comprising:

sending the second response to a client device on which the first and the second third party applications are implemented, the second response further comprising information that is useable by the client device to determine which of the first or the second third party applications is to receive the second response.

* * * * *